(12) United States Patent  (10) Patent No.: US 9,280,990 B1
Zhang et al.  (45) Date of Patent: Mar. 8, 2016

(54) METHOD FOR FABRICATING A MAGNETIC WRITER USING MULTIPLE ETCHES

(71) Applicant: Western Digital (Fremont), LLC, Fremont, CA (US)

(72) Inventors: Jinqiu Zhang, Fremont, CA (US); Feng Liu, San Ramon, CA (US); Hongmei Han, Fremont, CA (US); Ming Sun, Pleasanton, CA (US); Xiaotian Zhou, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/229,297

(22) Filed: Mar. 28, 2014

Related U.S. Application Data

(60) Provisional application No. 61/914,884, filed on Dec. 11, 2013.

(51) Int. Cl.
  *B44C 1/22* (2006.01)
  *G11B 5/31* (2006.01)

(52) U.S. Cl.
  CPC .................................... *G11B 5/3163* (2013.01)

(58) Field of Classification Search
  USPC ............ 216/22, 39, 41, 48, 65; 360/122, 317; 451/5, 41; 29/603.16, 603.13, 603.14
  See application file for complete search history.

(56) References Cited

U.S. PATENT DOCUMENTS

| | | | |
|---|---|---|---|
| 5,801,910 A | 9/1998 | Mallary | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |

(Continued)

OTHER PUBLICATIONS

Jinqiu Zhang, et al., U.S. Appl. No. 14/279,608, filed May 16, 2014, 36 pages.

(Continued)

*Primary Examiner* — Nadine Norton
*Assistant Examiner* — Maki Angadi

(57) ABSTRACT

A method and system provide a magnetic transducer having an air-bearing surface (ABS) location. The method includes forming a trench in the intermediate layer using a plurality of etches. A first etch substantially provides a first portion of the trench having a first sidewall angle. The second etch substantially provides a second portion of the trench having a second sidewall angle. The second sidewall angle is greater than the first sidewall angle. The second portion of the trench includes the ABS location. The method also includes providing a main pole in the trench. The main pole has a plurality of sidewalls. The sidewalls having the first sidewall angle in the first portion of the trench and the second sidewall angle in the second portion of the trench.

15 Claims, 12 Drawing Sheets

(56) References Cited

U.S. PATENT DOCUMENTS

| | | | |
|---|---|---|---|
| 6,103,073 | A | 8/2000 | Thayamballi |
| 6,108,166 | A | 8/2000 | Lederman |
| 6,118,629 | A | 9/2000 | Huai et al. |
| 6,118,638 | A | 9/2000 | Knapp et al. |
| 6,125,018 | A | 9/2000 | Takagishi et al. |
| 6,130,779 | A | 10/2000 | Carlson et al. |
| 6,134,089 | A | 10/2000 | Barr et al. |
| 6,136,166 | A | 10/2000 | Shen et al. |
| 6,137,661 | A | 10/2000 | Shi et al. |
| 6,137,662 | A | 10/2000 | Huai et al. |
| 6,160,684 | A | 12/2000 | Heist et al. |
| 6,163,426 | A | 12/2000 | Nepela et al. |
| 6,166,891 | A | 12/2000 | Lederman et al. |
| 6,172,848 | B1 | 1/2001 | Santini |
| 6,173,486 | B1 | 1/2001 | Hsiao et al. |
| 6,175,476 | B1 | 1/2001 | Huai et al. |
| 6,178,066 | B1 | 1/2001 | Barr |
| 6,178,070 | B1 | 1/2001 | Hong et al. |
| 6,178,150 | B1 | 1/2001 | Davis |
| 6,181,485 | B1 | 1/2001 | He |
| 6,181,525 | B1 | 1/2001 | Carlson |
| 6,185,051 | B1 | 2/2001 | Chen et al. |
| 6,185,077 | B1 | 2/2001 | Tong et al. |
| 6,185,081 | B1 | 2/2001 | Simion et al. |
| 6,188,549 | B1 | 2/2001 | Wiitala |
| 6,190,764 | B1 | 2/2001 | Shi et al. |
| 6,193,584 | B1 | 2/2001 | Rudy et al. |
| 6,195,229 | B1 | 2/2001 | Shen et al. |
| 6,198,608 | B1 | 3/2001 | Hong et al. |
| 6,198,609 | B1 | 3/2001 | Barr et al. |
| 6,201,673 | B1 | 3/2001 | Rottmayer et al. |
| 6,204,998 | B1 | 3/2001 | Katz |
| 6,204,999 | B1 | 3/2001 | Crue et al. |
| 6,212,153 | B1 | 4/2001 | Chen et al. |
| 6,215,625 | B1 | 4/2001 | Carlson |
| 6,219,205 | B1 | 4/2001 | Yuan et al. |
| 6,221,218 | B1 | 4/2001 | Shi et al. |
| 6,222,707 | B1 | 4/2001 | Huai et al. |
| 6,229,782 | B1 | 5/2001 | Wang et al. |
| 6,230,959 | B1 | 5/2001 | Heist et al. |
| 6,233,116 | B1 | 5/2001 | Chen et al. |
| 6,233,125 | B1 | 5/2001 | Knapp et al. |
| 6,237,215 | B1 | 5/2001 | Hunsaker et al. |
| 6,252,743 | B1 | 6/2001 | Bozorgi |
| 6,255,721 | B1 | 7/2001 | Roberts |
| 6,258,468 | B1 | 7/2001 | Mahvan et al. |
| 6,266,216 | B1 | 7/2001 | Hikami et al. |
| 6,271,604 | B1 | 8/2001 | Frank, Jr. et al. |
| 6,275,354 | B1 | 8/2001 | Huai et al. |
| 6,277,505 | B1 | 8/2001 | Shi et al. |
| 6,282,056 | B1 | 8/2001 | Feng et al. |
| 6,296,955 | B1 | 10/2001 | Hossain et al. |
| 6,297,955 | B1 | 10/2001 | Frank, Jr. et al. |
| 6,304,414 | B1 | 10/2001 | Crue, Jr. et al. |
| 6,307,715 | B1 | 10/2001 | Berding et al. |
| 6,310,746 | B1 | 10/2001 | Hawwa et al. |
| 6,310,750 | B1 | 10/2001 | Hawwa et al. |
| 6,317,290 | B1 | 11/2001 | Wang et al. |
| 6,317,297 | B1 | 11/2001 | Tong et al. |
| 6,322,911 | B1 | 11/2001 | Fukagawa et al. |
| 6,330,136 | B1 | 12/2001 | Wang et al. |
| 6,330,137 | B1 | 12/2001 | Knapp et al. |
| 6,333,830 | B2 | 12/2001 | Rose et al. |
| 6,340,533 | B1 | 1/2002 | Ueno et al. |
| 6,349,014 | B1 | 2/2002 | Crue, Jr. et al. |
| 6,351,355 | B1 | 2/2002 | Min et al. |
| 6,353,318 | B1 | 3/2002 | Sin et al. |
| 6,353,511 | B1 | 3/2002 | Shi et al. |
| 6,356,412 | B1 | 3/2002 | Levi et al. |
| 6,359,779 | B1 | 3/2002 | Frank, Jr. et al. |
| 6,369,983 | B1 | 4/2002 | Hong |
| 6,376,964 | B1 | 4/2002 | Young et al. |
| 6,377,535 | B1 | 4/2002 | Chen et al. |
| 6,381,095 | B1 | 4/2002 | Sin et al. |
| 6,381,105 | B1 | 4/2002 | Huai et al. |
| 6,389,499 | B1 | 5/2002 | Frank, Jr. et al. |
| 6,392,850 | B1 | 5/2002 | Tong et al. |
| 6,396,660 | B1 | 5/2002 | Jensen et al. |
| 6,399,179 | B1 | 6/2002 | Hanrahan et al. |
| 6,400,526 | B2 | 6/2002 | Crue, Jr. et al. |
| 6,404,600 | B1 | 6/2002 | Hawwa et al. |
| 6,404,601 | B1 | 6/2002 | Rottmayer et al. |
| 6,404,706 | B1 | 6/2002 | Stovall et al. |
| 6,410,170 | B1 | 6/2002 | Chen et al. |
| 6,411,522 | B1 | 6/2002 | Frank, Jr. et al. |
| 6,417,998 | B1 | 7/2002 | Crue, Jr. et al. |
| 6,417,999 | B1 | 7/2002 | Knapp et al. |
| 6,418,000 | B1 | 7/2002 | Gibbons et al. |
| 6,418,048 | B1 | 7/2002 | Sin et al. |
| 6,421,211 | B1 | 7/2002 | Hawwa et al. |
| 6,421,212 | B1 | 7/2002 | Gibbons et al. |
| 6,424,505 | B1 | 7/2002 | Lam et al. |
| 6,424,507 | B1 | 7/2002 | Lederman et al. |
| 6,430,009 | B1 | 8/2002 | Komaki et al. |
| 6,430,806 | B1 | 8/2002 | Chen et al. |
| 6,433,965 | B1 | 8/2002 | Gopinathan et al. |
| 6,433,968 | B1 | 8/2002 | Shi et al. |
| 6,433,970 | B1 | 8/2002 | Knapp et al. |
| 6,437,945 | B1 | 8/2002 | Hawwa et al. |
| 6,445,536 | B1 | 9/2002 | Rudy et al. |
| 6,445,542 | B1 | 9/2002 | Levi et al. |
| 6,445,553 | B2 | 9/2002 | Barr et al. |
| 6,445,554 | B1 | 9/2002 | Dong et al. |
| 6,447,935 | B1 | 9/2002 | Zhang et al. |
| 6,448,765 | B1 | 9/2002 | Chen et al. |
| 6,451,514 | B1 | 9/2002 | Iitsuka |
| 6,452,742 | B1 | 9/2002 | Crue et al. |
| 6,452,765 | B1 | 9/2002 | Mahvan et al. |
| 6,456,465 | B1 | 9/2002 | Louis et al. |
| 6,459,552 | B1 | 10/2002 | Liu et al. |
| 6,462,920 | B1 | 10/2002 | Karimi |
| 6,466,401 | B1 | 10/2002 | Hong et al. |
| 6,466,402 | B1 | 10/2002 | Crue, Jr. et al. |
| 6,466,404 | B1 | 10/2002 | Crue, Jr. et al. |
| 6,468,436 | B1 | 10/2002 | Shi et al. |
| 6,469,877 | B1 | 10/2002 | Knapp et al. |
| 6,477,019 | B2 | 11/2002 | Matono et al. |
| 6,479,096 | B1 | 11/2002 | Shi et al. |
| 6,483,662 | B1 | 11/2002 | Thomas et al. |
| 6,487,040 | B1 | 11/2002 | Hsiao et al. |
| 6,487,056 | B1 | 11/2002 | Gibbons et al. |
| 6,490,125 | B1 | 12/2002 | Barr |
| 6,496,330 | B1 | 12/2002 | Crue, Jr. et al. |
| 6,496,334 | B1 | 12/2002 | Pang et al. |
| 6,504,675 | B1 | 1/2003 | Skukh et al. |
| 6,504,676 | B1 | 1/2003 | Hiner et al. |
| 6,512,657 | B2 | 1/2003 | Heist et al. |
| 6,512,659 | B1 | 1/2003 | Hawwa et al. |
| 6,512,661 | B1 | 1/2003 | Louis |
| 6,512,690 | B1 | 1/2003 | Qi et al. |
| 6,515,573 | B1 | 2/2003 | Dong et al. |
| 6,515,791 | B1 | 2/2003 | Hawwa et al. |
| 6,532,823 | B1 | 3/2003 | Knapp et al. |
| 6,535,363 | B1 | 3/2003 | Hosomi et al. |
| 6,552,874 | B1 | 4/2003 | Chen et al. |
| 6,552,928 | B1 | 4/2003 | Qi et al. |
| 6,577,470 | B1 | 6/2003 | Rumpler |
| 6,583,961 | B2 | 6/2003 | Levi et al. |
| 6,583,968 | B1 | 6/2003 | Scura et al. |
| 6,597,548 | B1 | 7/2003 | Yamanaka et al. |
| 6,611,398 | B1 | 8/2003 | Rumpler et al. |
| 6,618,223 | B1 | 9/2003 | Chen et al. |
| 6,629,357 | B1 | 10/2003 | Akoh |
| 6,633,464 | B2 | 10/2003 | Lai et al. |
| 6,636,394 | B1 | 10/2003 | Fukagawa et al. |
| 6,639,291 | B1 | 10/2003 | Sin et al. |
| 6,650,503 | B1 | 11/2003 | Chen et al. |
| 6,650,506 | B1 | 11/2003 | Risse |
| 6,654,195 | B1 | 11/2003 | Frank, Jr. et al. |
| 6,657,816 | B1 | 12/2003 | Barr et al. |
| 6,661,621 | B1 | 12/2003 | Iitsuka |
| 6,661,625 | B1 | 12/2003 | Sin et al. |
| 6,674,610 | B1 | 1/2004 | Thomas et al. |
| 6,680,863 | B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,710,973 B2 | 3/2004 | Okada et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,722,018 B2 | 4/2004 | Santini |
| 6,724,569 B1 | 4/2004 | Chen et al. |
| 6,724,572 B1 | 4/2004 | Stoev et al. |
| 6,729,015 B2 | 5/2004 | Matono et al. |
| 6,731,460 B2 | 5/2004 | Sasaki |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,762,911 B2 | 7/2004 | Sasaki et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,813,116 B2 | 11/2004 | Nakamura et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,857,181 B2 | 2/2005 | Lo et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,903,900 B2 | 6/2005 | Sato et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,255 B2 | 9/2005 | Hsiao et al. |
| 6,947,258 B1 | 9/2005 | Li |
| 6,950,266 B1 | 9/2005 | McCaslin et al. |
| 6,950,277 B1 | 9/2005 | Nguy et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,949 B2 | 2/2006 | Nakamura et al. |
| 7,006,326 B2 | 2/2006 | Okada et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,100,266 B2 | 9/2006 | Plumer et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,252 B2 | 11/2006 | Takano et al. |
| 7,133,253 B1 | 11/2006 | Seagle et al. |
| 7,134,185 B1 | 11/2006 | Knapp et al. |
| 7,139,153 B2 | 11/2006 | Hsiao et al. |
| 7,154,715 B2 | 12/2006 | Yamanaka et al. |
| 7,159,302 B2 | 1/2007 | Feldbaum et al. |
| 7,170,725 B1 | 1/2007 | Zhou et al. |
| 7,177,117 B1 | 2/2007 | Jiang et al. |
| 7,185,415 B2 | 3/2007 | Khera et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,379 B2 | 5/2007 | Hsu et al. |
| 7,212,384 B1 | 5/2007 | Stoev et al. |
| 7,238,292 B1 | 7/2007 | He et al. |
| 7,239,478 B1 | 7/2007 | Sin et al. |
| 7,245,454 B2 | 7/2007 | Aoki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,251,878 B2 | 8/2007 | Le et al. |
| 7,253,992 B2 | 8/2007 | Chen et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,338 B2 | 11/2007 | Le et al. |
| 7,296,339 B1 | 11/2007 | Yang et al. |
| 7,307,814 B1 | 12/2007 | Seagle et al. |
| 7,307,818 B1 | 12/2007 | Park et al. |

(56) References Cited

U.S. PATENT DOCUMENTS

| | | | |
|---|---|---|---|
| 7,310,204 B1 | 12/2007 | Stoev et al. | |
| 7,318,947 B1 | 1/2008 | Park et al. | |
| 7,322,096 B2 * | 1/2008 | Biskeborn et al. | 29/603.16 |
| 7,324,304 B1 | 1/2008 | Benakli et al. | |
| 7,333,295 B1 | 2/2008 | Medina et al. | |
| 7,337,530 B1 | 3/2008 | Stoev et al. | |
| 7,342,752 B1 | 3/2008 | Zhang et al. | |
| 7,349,170 B1 | 3/2008 | Rudman et al. | |
| 7,349,179 B1 | 3/2008 | He et al. | |
| 7,354,664 B1 | 4/2008 | Jiang et al. | |
| 7,363,697 B1 | 4/2008 | Dunn et al. | |
| 7,369,359 B2 | 5/2008 | Fujita et al. | |
| 7,371,152 B1 | 5/2008 | Newman | |
| 7,372,665 B1 | 5/2008 | Stoev et al. | |
| 7,375,926 B1 | 5/2008 | Stoev et al. | |
| 7,379,269 B1 | 5/2008 | Krounbi et al. | |
| 7,386,933 B1 | 6/2008 | Krounbi et al. | |
| 7,389,577 B1 | 6/2008 | Shang et al. | |
| 7,392,577 B2 | 7/2008 | Yazawa et al. | |
| 7,417,832 B1 | 8/2008 | Erickson et al. | |
| 7,419,891 B1 | 9/2008 | Chen et al. | |
| 7,428,124 B1 | 9/2008 | Song et al. | |
| 7,430,095 B2 | 9/2008 | Benakli et al. | |
| 7,430,098 B1 | 9/2008 | Song et al. | |
| 7,436,620 B1 | 10/2008 | Kang et al. | |
| 7,436,638 B1 | 10/2008 | Pan | |
| 7,440,220 B1 | 10/2008 | Kang et al. | |
| 7,441,325 B2 | 10/2008 | Gao et al. | |
| 7,443,632 B1 | 10/2008 | Stoev et al. | |
| 7,444,740 B1 | 11/2008 | Chung et al. | |
| 7,464,457 B2 | 12/2008 | Le et al. | |
| 7,469,467 B2 | 12/2008 | Gao et al. | |
| 7,493,688 B1 | 2/2009 | Wang et al. | |
| 7,508,626 B2 | 3/2009 | Ichihara et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,535,675 B2 | 5/2009 | Kimura et al. | |
| 7,542,246 B1 | 6/2009 | Song et al. | |
| 7,551,406 B1 | 6/2009 | Thomas et al. | |
| 7,552,523 B1 | 6/2009 | He et al. | |
| 7,554,767 B1 | 6/2009 | Hu et al. | |
| 7,558,019 B2 | 7/2009 | Le et al. | |
| 7,580,222 B2 | 8/2009 | Sasaki et al. | |
| 7,583,466 B2 | 9/2009 | Kermiche et al. | |
| 7,595,967 B1 | 9/2009 | Moon et al. | |
| 7,639,451 B2 | 12/2009 | Yatsu et al. | |
| 7,639,452 B2 | 12/2009 | Mochizuki et al. | |
| 7,639,457 B1 | 12/2009 | Chen et al. | |
| 7,643,246 B2 | 1/2010 | Yazawa et al. | |
| 7,660,080 B1 | 2/2010 | Liu et al. | |
| 7,663,839 B2 | 2/2010 | Sasaki et al. | |
| 7,672,079 B2 | 3/2010 | Li et al. | |
| 7,672,080 B1 | 3/2010 | Tang et al. | |
| 7,672,086 B1 | 3/2010 | Jiang | |
| 7,684,160 B1 | 3/2010 | Erickson et al. | |
| 7,688,546 B1 | 3/2010 | Bai et al. | |
| 7,691,434 B1 | 4/2010 | Zhang et al. | |
| 7,695,761 B1 | 4/2010 | Shen et al. | |
| 7,719,795 B2 | 5/2010 | Hu et al. | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,748,104 B2 | 7/2010 | Bonhote et al. | |
| 7,764,469 B2 | 7/2010 | Ho et al. | |
| 7,785,666 B1 | 8/2010 | Sun et al. | |
| 7,796,356 B1 | 9/2010 | Fowler et al. | |
| 7,796,360 B2 | 9/2010 | Im et al. | |
| 7,796,361 B2 | 9/2010 | Sasaki et al. | |
| 7,800,858 B1 | 9/2010 | Bajikar et al. | |
| 7,819,979 B1 | 10/2010 | Chen et al. | |
| 7,829,264 B1 | 11/2010 | Wang et al. | |
| 7,841,068 B2 | 11/2010 | Chen et al. | |
| 7,846,643 B1 | 12/2010 | Sun et al. | |
| 7,855,854 B2 | 12/2010 | Hu et al. | |
| 7,859,791 B2 | 12/2010 | Toma et al. | |
| 7,869,160 B1 | 1/2011 | Pan et al. | |
| 7,872,824 B1 | 1/2011 | Macchioni et al. | |
| 7,872,833 B2 | 1/2011 | Hu et al. | |
| 7,881,019 B2 | 2/2011 | Hsiao et al. | |
| 7,898,773 B2 | 3/2011 | Han et al. | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 7,916,425 B2 | 3/2011 | Sasaki et al. | |
| 7,916,426 B2 | 3/2011 | Hu et al. | |
| 7,918,013 B1 | 4/2011 | Dunn et al. | |
| 7,921,544 B2 | 4/2011 | Sasaki et al. | |
| 7,924,528 B2 | 4/2011 | Sasaki et al. | |
| 7,968,219 B1 | 6/2011 | Jiang et al. | |
| 7,982,989 B1 | 7/2011 | Shi et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,024,748 B1 | 9/2011 | Moravec et al. | |
| 8,027,125 B2 | 9/2011 | Lee et al. | |
| 8,054,586 B2 | 11/2011 | Balamane et al. | |
| 8,066,892 B2 | 11/2011 | Guthrie et al. | |
| 8,072,705 B1 | 12/2011 | Wang et al. | |
| 8,074,345 B1 | 12/2011 | Anguelouch et al. | |
| 8,077,418 B1 | 12/2011 | Hu et al. | |
| 8,077,434 B1 | 12/2011 | Shen et al. | |
| 8,077,435 B1 | 12/2011 | Liu et al. | |
| 8,077,557 B1 | 12/2011 | Hu et al. | |
| 8,079,135 B1 | 12/2011 | Shen et al. | |
| 8,081,403 B1 | 12/2011 | Chen et al. | |
| 8,091,210 B1 | 1/2012 | Sasaki et al. | |
| 8,097,846 B1 | 1/2012 | Anguelouch et al. | |
| 8,104,166 B1 | 1/2012 | Zhang et al. | |
| 8,116,033 B2 | 2/2012 | Kameda et al. | |
| 8,116,043 B2 | 2/2012 | Leng et al. | |
| 8,116,171 B1 | 2/2012 | Lee | |
| 8,117,738 B2 | 2/2012 | Han et al. | |
| 8,125,732 B2 | 2/2012 | Bai et al. | |
| 8,125,856 B1 | 2/2012 | Li et al. | |
| 8,134,794 B1 | 3/2012 | Wang | |
| 8,136,224 B1 | 3/2012 | Sun et al. | |
| 8,136,225 B1 | 3/2012 | Zhang et al. | |
| 8,136,805 B1 | 3/2012 | Lee | |
| 8,141,235 B1 | 3/2012 | Zhang | |
| 8,146,236 B1 | 4/2012 | Luo et al. | |
| 8,149,536 B1 | 4/2012 | Yang et al. | |
| 8,151,441 B1 | 4/2012 | Rudy et al. | |
| 8,163,185 B1 | 4/2012 | Sun et al. | |
| 8,164,760 B2 | 4/2012 | Willis | |
| 8,164,855 B1 | 4/2012 | Gibbons et al. | |
| 8,164,864 B2 | 4/2012 | Kaiser et al. | |
| 8,165,709 B1 | 4/2012 | Rudy | |
| 8,166,631 B1 | 5/2012 | Tran et al. | |
| 8,166,632 B1 | 5/2012 | Zhang et al. | |
| 8,169,473 B1 | 5/2012 | Yu et al. | |
| 8,169,741 B2 | 5/2012 | Taguchi et al. | |
| 8,171,618 B1 | 5/2012 | Wang et al. | |
| 8,179,636 B1 | 5/2012 | Bai et al. | |
| 8,184,399 B2 | 5/2012 | Wu et al. | |
| 8,191,237 B1 | 6/2012 | Luo et al. | |
| 8,194,365 B1 | 6/2012 | Leng et al. | |
| 8,194,366 B1 | 6/2012 | Li et al. | |
| 8,196,285 B1 | 6/2012 | Zhang et al. | |
| 8,200,054 B1 | 6/2012 | Li et al. | |
| 8,203,800 B2 | 6/2012 | Li et al. | |
| 8,208,350 B1 | 6/2012 | Hu et al. | |
| 8,220,140 B1 | 7/2012 | Wang et al. | |
| 8,222,599 B1 | 7/2012 | Chien | |
| 8,225,488 B1 | 7/2012 | Zhang et al. | |
| 8,227,023 B1 | 7/2012 | Liu et al. | |
| 8,228,633 B1 | 7/2012 | Tran et al. | |
| 8,231,796 B1 * | 7/2012 | Li et al. | 216/22 |
| 8,233,233 B1 | 7/2012 | Shen et al. | |
| 8,233,234 B2 | 7/2012 | Hsiao et al. | |

(56) References Cited

U.S. PATENT DOCUMENTS

| | | | |
|---|---|---|---|
| 8,233,235 B2 | 7/2012 | Chen et al. |
| 8,233,248 B1 | 7/2012 | Li et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,109 B2 | 9/2012 | Ohtsu |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,649 B2 | 10/2012 | Sasaki et al. |
| 8,289,821 B1 | 10/2012 | Huber |
| 8,291,743 B1 | 10/2012 | Shi et al. |
| 8,305,711 B2 | 11/2012 | Li et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,687 B2 | 7/2013 | Sasaki et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,080 B2 | 7/2013 | Sasaki et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 * | 10/2013 | Zhang et al. .................. 428/800 |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |

(56) References Cited

U.S. PATENT DOCUMENTS

| | | |
|---|---|---|
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 * | 4/2014 | Li et al. .................... 360/125.13 |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0076630 A1 | 4/2003 | Sato et al. |
| 2004/0061988 A1 | 4/2004 | Matono et al. |
| 2004/0184191 A1 | 9/2004 | Ichihara et al. |
| 2005/0117251 A1 | 6/2005 | Matono et al. |
| 2005/0162778 A1 | 7/2005 | Kimura et al. |
| 2006/0044677 A1 | 3/2006 | Li et al. |
| 2006/0158779 A1 | 7/2006 | Ota et al. |
| 2006/0174474 A1 | 8/2006 | Le |
| 2006/0225268 A1 | 10/2006 | Le et al. |
| 2006/0288565 A1 | 12/2006 | Le et al. |
| 2007/0211380 A1 | 9/2007 | Akimoto et al. |
| 2007/0236834 A1 | 10/2007 | Toma et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002309 A1 | 1/2008 | Hsu et al. |
| 2008/0151437 A1 | 6/2008 | Chen et al. |
| 2008/0232001 A1 | 9/2008 | Bonhote et al. |
| 2008/0273276 A1 | 11/2008 | Guan |
| 2008/0273277 A1 | 11/2008 | Guan et al. |
| 2009/0279206 A1 | 11/2009 | Yang et al. |
| 2010/0112486 A1 | 5/2010 | Zhang et al. |
| 2010/0146773 A1 | 6/2010 | Li et al. |
| 2010/0165517 A1 | 7/2010 | Araki et al. |
| 2010/0277832 A1 | 11/2010 | Bai et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0146060 A1 | 6/2011 | Han et al. |
| 2011/0151279 A1 | 6/2011 | Allen et al. |
| 2011/0205671 A1 | 8/2011 | Benakli et al. |
| 2011/0222188 A1 | 9/2011 | Etoh et al. |
| 2012/0111826 A1 | 5/2012 | Chen et al. |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0268845 A1 | 10/2012 | Sahoo et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Jinquiu Zhang, et al., U.S. Appl. No. 14/280,342, filed May 16, 2014, 38 pages.

Feng Liu, et al., U.S. Appl. No. 13/631,808, filed Sep. 28, 2012, 16 pages.

M. Mallary, et al., "One Terabit per Square Inch Perpendicular Recording Conceptual Design," IEEE Transactions on Magnetics, vol. 38, No., Jul. 4, 2002, pp. 1719-1724.

Jinqiu Zhang, et al., U.S. Appl. No. 14/046,790, filed Oct. 4, 2013, 26 pages.

* cited by examiner

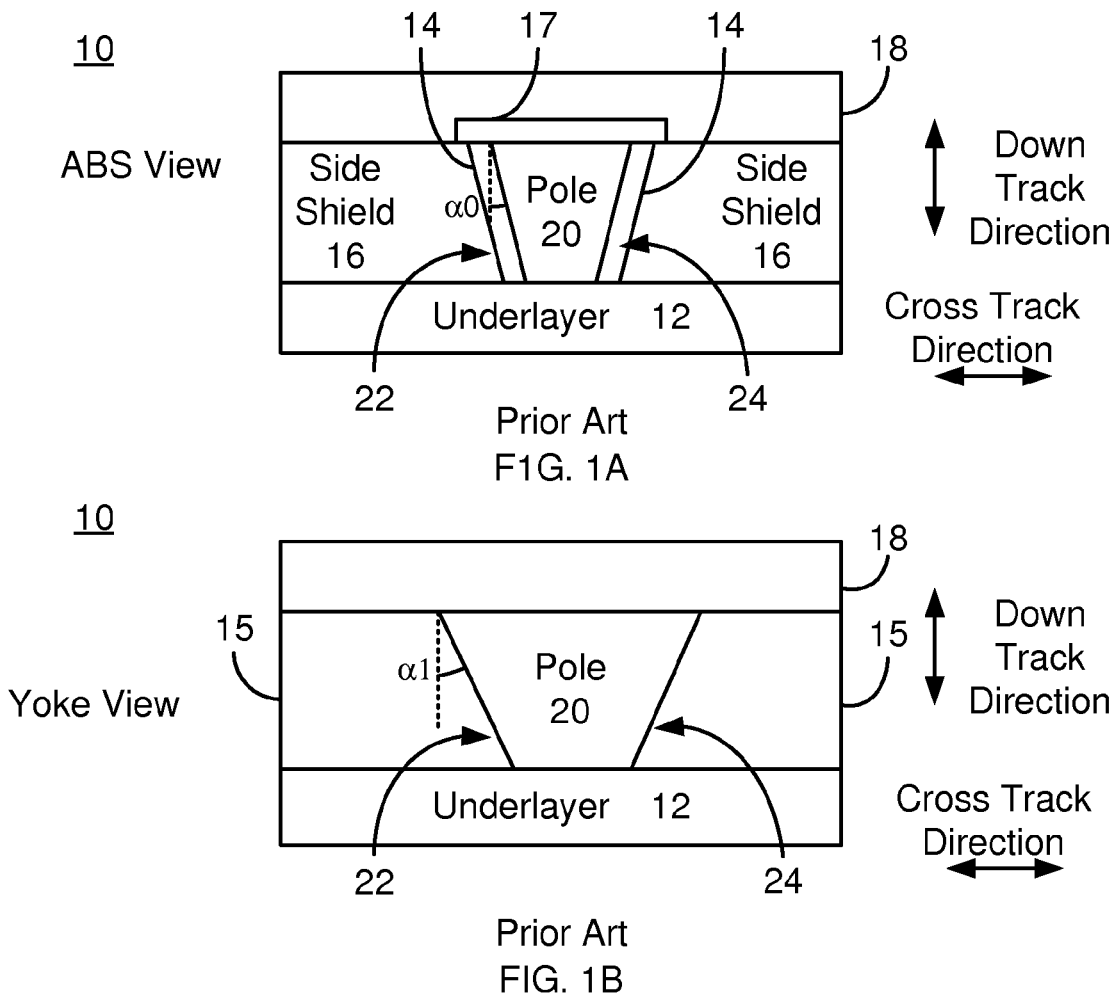

ABS View

Recessed View

ABS View

Recessed View

ABS View

Recessed View

ABS View

Recessed View

Plan View

ABS View

Recessed View

Plan View

ABS View

Recessed View

Plan View

Yoke View

Side View

Side View

Plan View

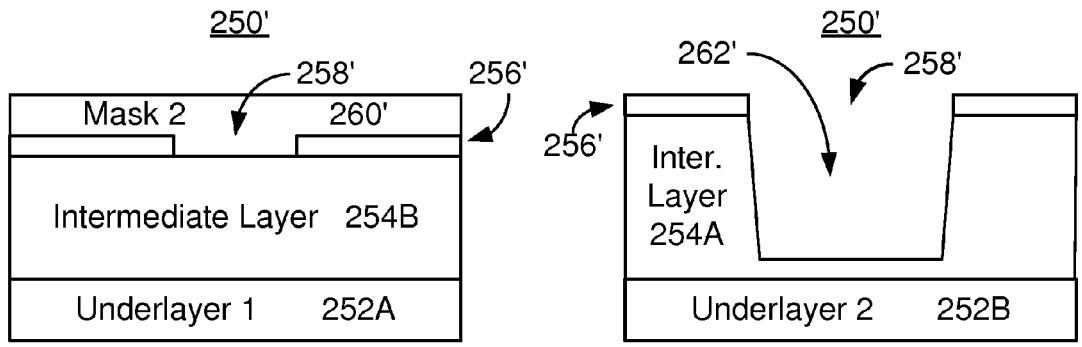
ABS View
FIG. 13A
Recessed View
FIG. 13B
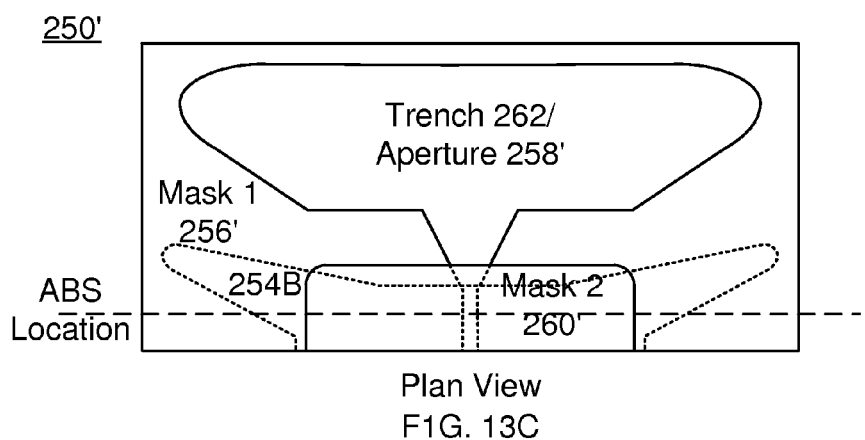
Plan View
FIG. 13C
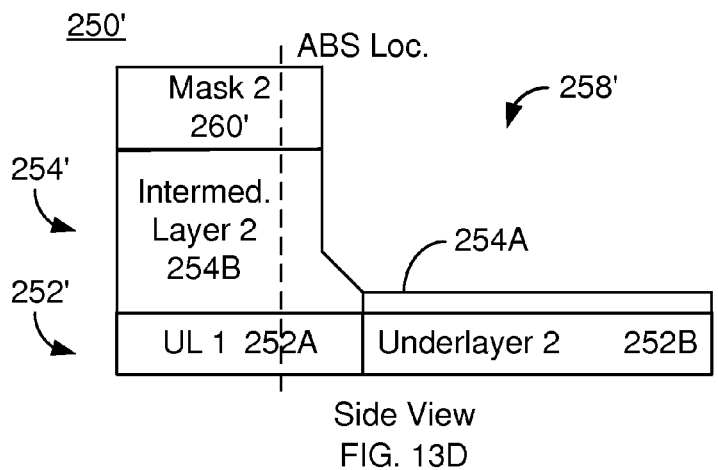
Side View
FIG. 13D

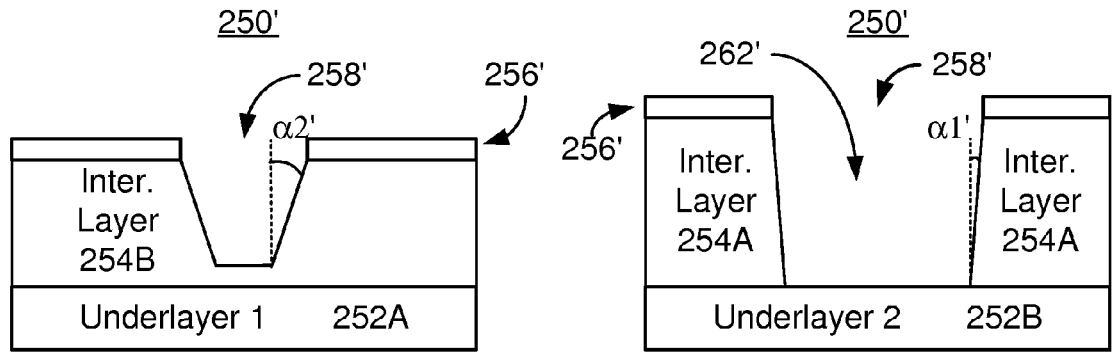
ABS View
FIG. 14A
Recessed View
FIG. 14B
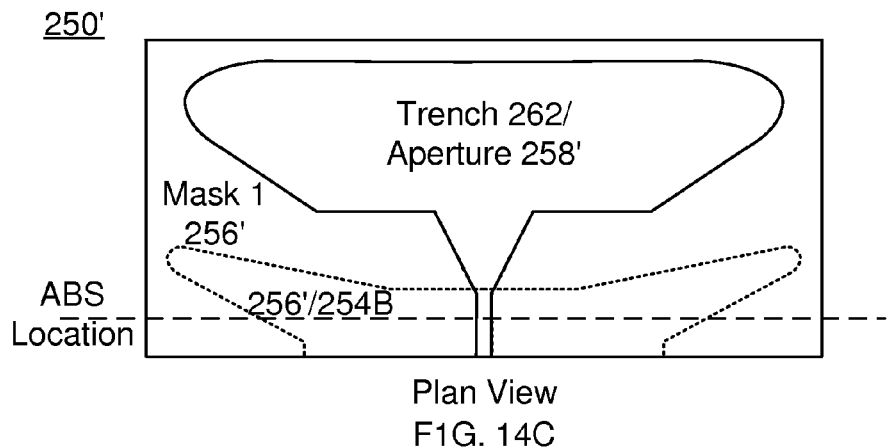
Plan View
FIG. 14C
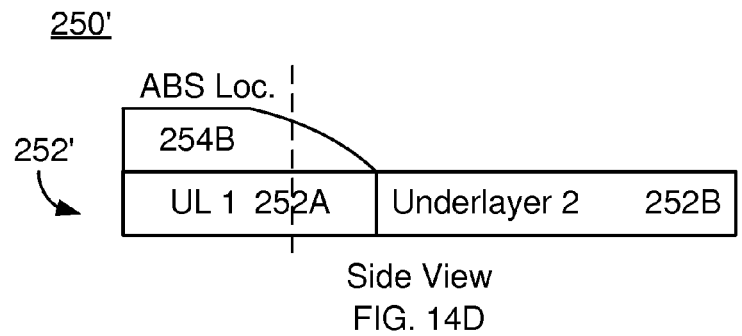
Side View
FIG. 14D ABS View Recessed View Plan View Side View Yoke View ABS View Recessed View Plan View Yoke View

METHOD FOR FABRICATING A MAGNETIC WRITER USING MULTIPLE ETCHES

CROSS-REFERENCE TO RELATED APPLICATIONS

This application claims priority to provisional U.S. Patent Application Ser. No. 61/914,884, filed on Dec. 11, 2013, which is hereby incorporated by reference in its entirety.

BACKGROUND

FIGS. 1A and 1B depict air-bearing surface (ABS) and yoke views of a conventional magnetic recording head 10. The magnetic recording transducer 10 may be a perpendicular magnetic recording (PMR) head. The conventional magnetic recording transducer 10 may be a part of a merged head including the write transducer 10 and a read transducer (not shown). Alternatively, the magnetic recording head may be a write head including only the write transducer 10. The conventional transducer 10 includes an underlayer 12, side gap 14, side shields 16, top gap 17, optional top shield 18 and main pole 20.

The main pole 20 resides on an underlayer 12 and includes sidewalls 22 and 24. The sidewalls 22 and 24 of the conventional main pole 20 form an angle $\alpha 0$ with the down track direction at the ABS and an angle $\alpha 1$ with the down track direction at the distance x1 from the ABS. As can be seen in FIGS. 1A and 1B, portions of the main pole 20 recessed from the ABS in the stripe height direction are wider in the cross track direction than at the ABS. In addition, the angle between the sidewalls 22 and 24 and the down track direction increases. Thus, $\alpha 1$ is greater than $\alpha 0$. For example, if $\alpha 0$ is on the order of 13°, then $\alpha 1$ may be 25°.

The side shields 16 are separated from the main pole 20 by a side gap 14. The side shields 16 extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities. For example, the write field of the conventional main pole 20 may not have a sufficiently high magnitude write field without introducing adjacent track interference (ATI) issues. Accordingly, what is needed is a system and method for improving the performance of a magnetic recording head.

BRIEF DESCRIPTION OF SEVERAL VIEWS OF THE DRAWINGS

FIGS. 1A-1B depict ABS and yoke views of a conventional magnetic recording head.

FIG. 2 depicts a flow chart of an exemplary embodiment of a method for providing a magnetic recording transducer.

FIGS. 11 through 16A, 16B, 16C and 16D depict various views of an exemplary embodiment of a magnetic recording transducer fabricated using the method.

DETAILED DESCRIPTION OF THE PREFERRED EMBODIMENTS

Figure 3A:
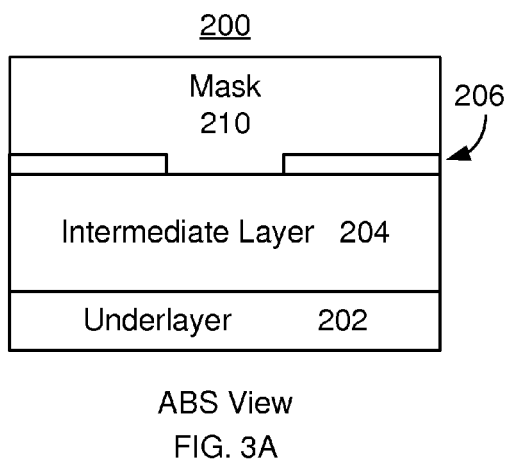
FIGS. 3A and 3B depict ABS and yoke views of an exemplary embodiment of a magnetic recording transducer during fabrication.

FIG. 2 depicts an exemplary embodiment of a method 100 for providing a magnetic recording transducer. For simplicity, some steps may be omitted, interleaved, and/or combined. FIGS. 3A and 3B through 5A, 5B and 5C depict various views of a transducer 200 during fabrication using the method 100. For clarity, FIGS. 3A-5C are not to scale. For simplicity not all portions of the disk drive and transducer 200 are shown. In addition, although the disk drive and transducer 200 are depicted in the context of particular components other and/or different components may be used. For example, circuitry used to drive and control various portions of the disk drive is not shown. For simplicity, only single components are shown. However, multiples of each component and/or their sub-components, might be used. The disk drive 100 may be a perpendicular magnetic recording (PMR) disk drive. However, in other embodiments, the disk drive 100 may be configured for other types of magnetic recording included but not limited to heat assisted magnetic recording (HAMR).

Referring to FIGS. 2-5C, the method 100 is described in the context of providing a magnetic recording disk drive and transducer 200. However, the method 100 may be used to fabricate multiple magnetic recording transducers at substantially the same time. The method 100 may also be used to fabricate other magnetic recording transducers. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated.

A trench is formed in an intermediate layer using multiple etches, via step 102. The trench is formed such that the trench has different sidewall angles in different portions of the pole. For example, the sidewall angles at and near the ABS may be larger (further from perpendicular to the surface of the intermediate layer) than the sidewall angles in regions recessed from the ABS (termed the yoke herein). Step 102 includes using multiple etches in order to form various sidewall angles. A first etch may provide a first portion of the trench having a first sidewall angle, while a second etch may provide a second portion of the trench having a second sidewall angle. For example, a first etch may be performed on the portion of the intermediate layer corresponding to the yoke, while the second etch may be performed on the portion of the intermediate layer corresponding to the pole tip, including ABS location. In some embodiments, the pole tip is masked during the first etch and the yoke region covered by a mask during the second etch. In other embodiments, the yoke region may be uncovered during the second etch. In some such embodiments, the second etch of the pole tip region may also etch the yoke region. In other such embodiments, the second etch of the pole tip region is configured to leave the yoke region substantially unchanged. For example, the intermediate layer in the yoke region may be made of a different material than the intermediate layer in the pole tip region. This different material may not be removed by the etch chemistry used to form the trench in the pole tip region. In other embodiments, the pole tip region of the trench may be formed by the first etch, while the yoke region of the trench is formed by second etch.

Figure 3B:
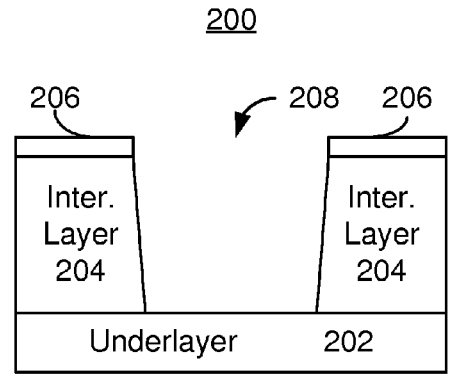
Figure 4A:
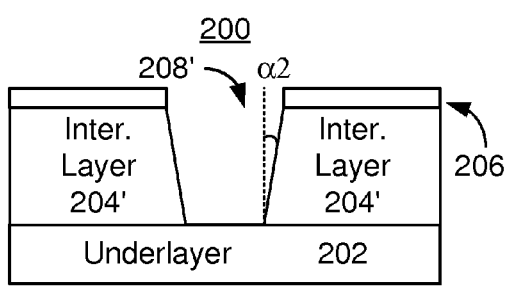
FIGS. 4A and 4B depict ABS and yoke views of an exemplary embodiment of a magnetic recording transducer during fabrication.
Figure 4B:
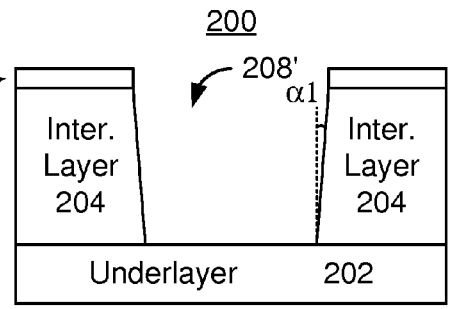

FIGS. 3A-3B and 4A-4B depict one embodiment of the transducer during step 102. FIGS. 3A and 3B depict ABS (pole tip) and recessed views of the transducer after the first etch is performed. An underlayer 202 and intermediate layer 204 are shown. The underlayer 202 may include a bottom (or leading edge) shield. The intermediate layer 204 may include one or more layers. The layers may be vertical and/or may be into the plane of the page. For example, the intermediate layer 204 in the recessed view may be formed of different material(s) than in the ABS view. A mask 206 having an aperture corresponding to the trench has been formed on the intermediate layer. This mask 206 and its aperture are in both the ABS and recessed regions. In addition, a mask 210 covers the intermediate layer in the pole tip region, including at the ABS. Because the mask 210 is not present in the recessed region, a portion of the intermediate layer has been removed by the etch, forming trench 208. FIGS. 4A-4B depict the transducer 200 after a second etch has been performed. The mask 210 is removed prior to the second etch. Thus, a trench 208' in the intermediate layer 204' has been formed. Because the second etch is completed, more of the intermediate layer 204' has been removed. In some embodiments, the intermediate layer 204' has been removed by the second etch in both the pole tip and yoke regions. In other embodiments, additional portions of the intermediate layer 204' have been removed only in the pole tip region. The trench 208' extends into the ABS and has a location that corresponds to the aperture in the mask 206. As can be seen in FIGS. 4A-4B, the geometry of the trench changes. For example, the trench 208' is wider in the recessed view than in the ABS view. In addition, the sidewall angles, α2 and α1, differ. In some embodiments, α2 is at least twelve degrees and not more than sixteen degrees. The sidewall angle is larger at the ABS than recessed from the ABS. Although α1 is shown as nonzero, in some embodiments, the sidewall angle for the trench 208' is zero degrees (substantially vertical sidewalls) in some portion of the trench. For example, α1 may be at least zero degrees and not more than five degrees. In some such embodiments, α1 is not more than three degrees. Thus, the sidewall angles may decrease to zero as the distance from the ABS increases. In some embodiments, the sidewall angle goes to zero at least fifteen nanometers and not more than thirty nanometers from the ABS. However, in other embodiments, the sidewall angle may reach zero degrees at a different distance from the ABS. For example, the sidewall angle may go to zero degrees up to two hundred nanometers from the ABS.

Figure 5A:
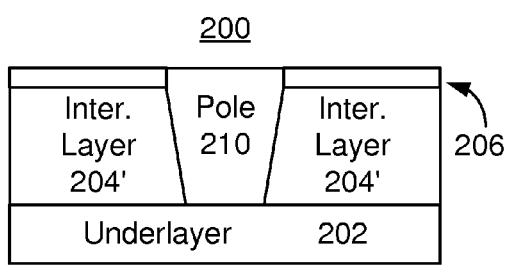
FIGS. 5A, 5B and 5C depict ABS, yoke and side views of an exemplary embodiment of a magnetic recording disk drive during fabrication.
Figure 5B:
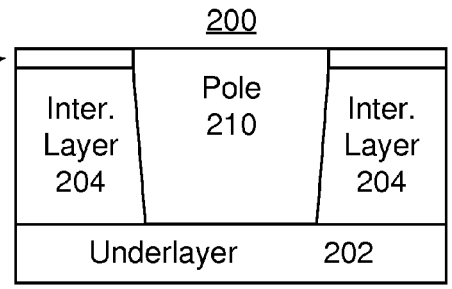
Figure 5C:
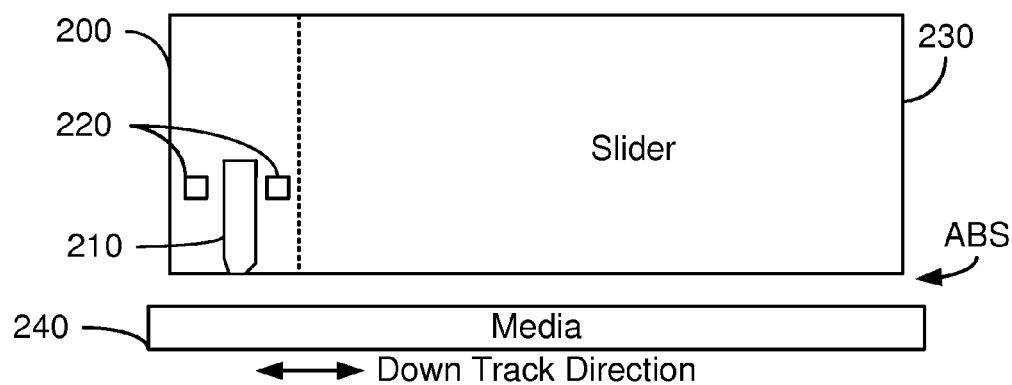

The main pole is provided in the trench 208', via step 104. In some embodiments, step 104 includes depositing a seed layer, such as Ru and/or magnetic seed layer(s). High saturation magnetization magnetic material(s) are also provided. For example, such magnetic materials may be plated and/or vacuum deposited. FIGS. 5A, 5B and 5C depicted ABS, recessed and side views of the transducer 200 after step 104 has been performed. The pole 210 is thus shown. For simplicity, any seed layers are not shown. Also shown in FIG. 5C are coil(s) 220, slider 230 and media 240. Although not shown, the slider 220 and thus the transducer 200 are generally attached to a suspension. In general, the disk drive includes the write transducer 200 and a read transducer (not shown). However, for clarity, only the write transducer 200 is shown.

The coil(s) 220 are used to energize the main pole 210. Two turns are depicted in FIG. 5C. Another number of turns may, however, be used. Note that only a portion of the coil(s) 210 may be shown in FIG. 5C. If, for example, the coil(s) 220 is a spiral, or pancake, coil, then additional portions of the coil(s) 220 may be located further from the ABS. Further, additional coils may also be used.

The pole 210 has sidewall angles that decrease with increasing distance from the ABS. Thus, the sidewall angles of the pole 210 are less in the recessed view than in the ABS view. FIGS. 5A and 5B depict the pole 210 as being conformal with the trench 208'. In some embodiments, however, at least a portion of the pole 210 is not conformal with the sides of the trench. In some embodiments, the pole 210 may have leading and/or trailing surface bevels, as shown in FIG. 5C.

Using the method 100, a magnetic transducer 200 having improved performance may be fabricated. For example, the sidewall angles of the pole may vary because of the manner in which the trench is formed. This may be achieved while exposing the ABS to only a single etch in forming the trench. In addition, a nonconformal side gap might be provided. This may also improve performance of the transducer 200. These benefits may be achieved without significantly complicating processing. Thus, performance of the disk drive may be improved.

Figure 6:
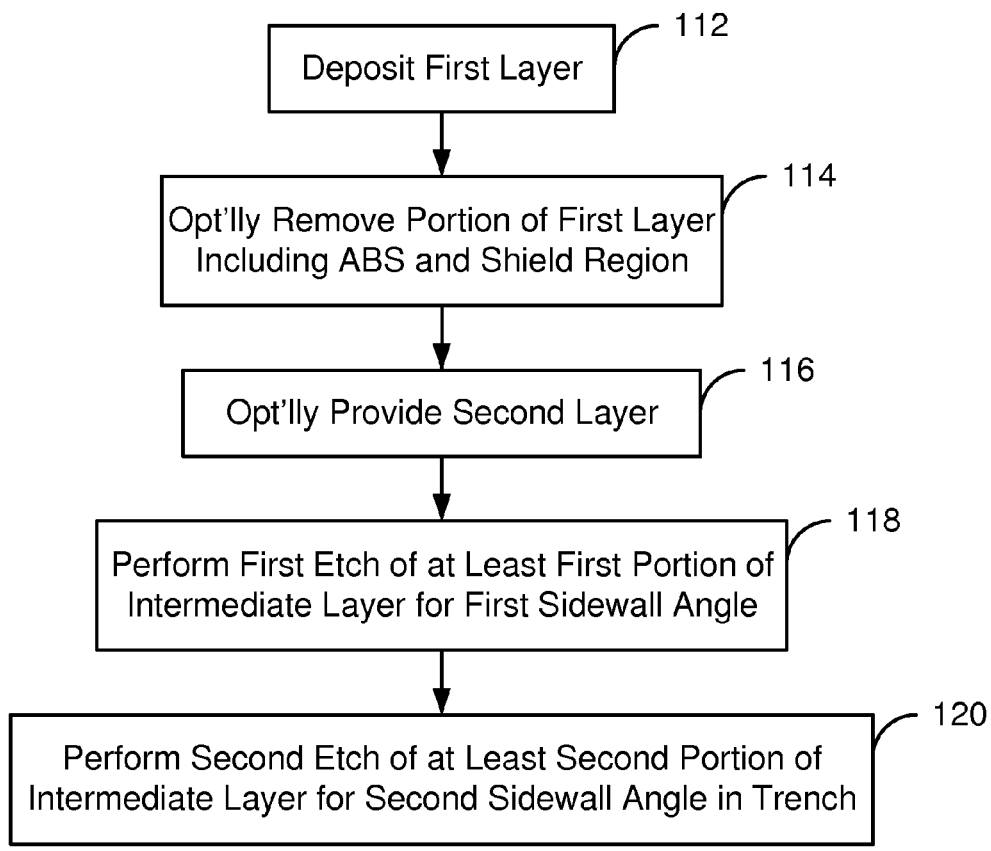
FIG. 6 depicts a flow chart of another exemplary embodiment of a method for providing a magnetic recording transducer.

FIG. 6 depicts an exemplary embodiment of a method 110 for providing a magnetic recording transducer. For simplicity, some steps may be omitted, interleaved, and/or combined. The method 110 is described in the context of providing a magnetic recording disk drive and transducer 200 depicted in FIGS. 3A-5C. However, the method 110 may be used to fabricate multiple magnetic recording heads at substantially the same time. The method 110 may also be used to fabricate other magnetic recording transducers. The method 110 is also described in the context of particular layers. A particular layer may include multiple materials and/or multiple sub-layers. The method 110 also may start after formation of other portions of the magnetic recording head. For example, the method 110 may start after a read transducer, return pole/shield and/or other structure have been fabricated.

Referring to FIGS. 3A-6, the intermediate layer 204 is provided in steps 112-116. A first layer is deposited, via step 112. The first layer deposited may be a full film (or blanket) deposition of aluminum oxide, silicon oxide, or some other reactive ion etchable material. If the intermediate layer is to be a single material, then steps 114 and 116 may be skipped. If, however, multiple layers are to be provided in a direction perpendicular to the ABS, then steps 114 and 116 may be performed. A portion of the first layer may be removed, via step 114. In some embodiments, the portion of the first layer removed includes the region in which the pole tip and side shield(s) are to be formed. Step 114 may be performed by providing a mask on the first layer having an aperture in the region desired to be removed and etching the first layer while the mask is in place. A second layer may then be provided, via step 116. Step 116 may include full film depositing the second layer and performing a planarization such as a chemical mechanical planarization (CMP). Thus, the intermediate layer includes different materials in different regions. In some embodiments, steps 114 and 116 may be repeated for other areas. In other embodiments, steps 114 and 116 may be achieved by depositing the first layer in step 112 in the presence of a mask. Steps 114 and 116 may be performed by lifting off the mask and depositing the second layer.

A first etch of the intermediate layer 208 is performed, via step 118. Thus, a portion of the trench is formed. This portion of the trench has a particular sidewall angle. Step 118 may be performed in the presence of one or more masks. If one mask is present, then the mask may expose only the portion of the intermediate layer to be removed in step 118. Alternatively, the aperture may expose regions of the intermediate layer that are not to be removed in step 118 if multiple materials are present and the etch chemistry used in step 118 only removes the desired material(s). Multiple masks may also be used. One mask may have a first aperture under which the entire trench is to be formed. Another mask may expose a portion of the first aperture and cover another portion of the first aperture. Thus, only a portion of the trench may be formed.

A second etch of the intermediate layer 208 is performed, via step 120. A second portion of the intermediate layer is removed and a second portion of the trench formed in step 120. Step 120 may be performed in an analogous manner to step 118. Thus, a trench 208' having varying sidewall angles may be provided.

The method 110 may be used to perform step 102 of the method 100 depicted in FIG. 2. Consequently, the method 110 may be used in fabricating a transducer 200 with the benefits described above. For example, the sidewall angles of the pole may vary because of the manner in which the trench is formed. This may be achieved while exposing the ABS to only a single etch in forming the trench. In addition, a non-conformal side gap might be provided. This may also improve performance of the transducer 200. These benefits may be achieved without significantly complicating processing. Thus, performance of the disk drive may be improved.

Figure 7:
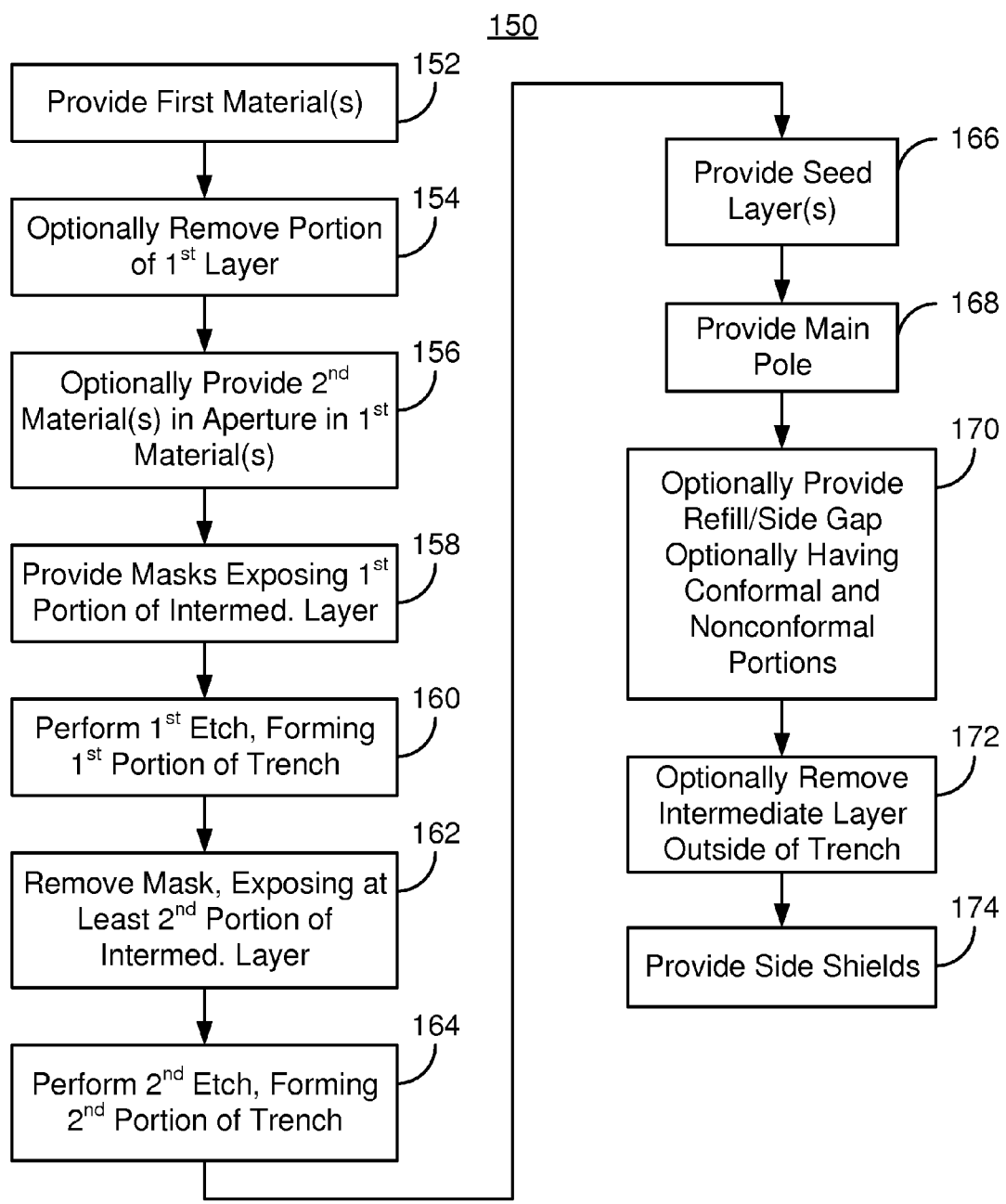
FIG. 7 depicts a flow chart of an exemplary embodiment of a method for providing a magnetic recording transducer.

FIG. 7 depicts an exemplary embodiment of a method 150 for providing a pole for a magnetic recording transducer having a main pole having varying a gradient in the side gap width. For simplicity, some steps may be omitted, interleaved, and/or combined. The method 150 is also described in the context of providing a magnetic recording transducer 250 depicted in FIGS. 8A-8C through FIGS. 10A-10D depict an exemplary embodiment of a transducer 250 during fabrication using the method 150. The method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

The first material(s) for the intermediate layer are provided, via step 152. This step may include full film depositing aluminum oxide, silicon oxide or another layer on an underlayer. A first portion of the first material(s) may optionally be removed, via step 154. Thus, an aperture may be formed in the first material(s). A second set of material(s) is optionally provided in the aperture formed in the first material(s), via step 156. Thus, an intermediate layer having multiple constituents may be formed in steps 152-156. For example, materials that are etchable using different etch chemistries may be used in steps 152-156. The material(s) may have the same or different etch characteristics for a particular etch chemistry. Thus, an intermediate layer in which the etching may be tailored is provided in steps 152-156.

Figure 8A:
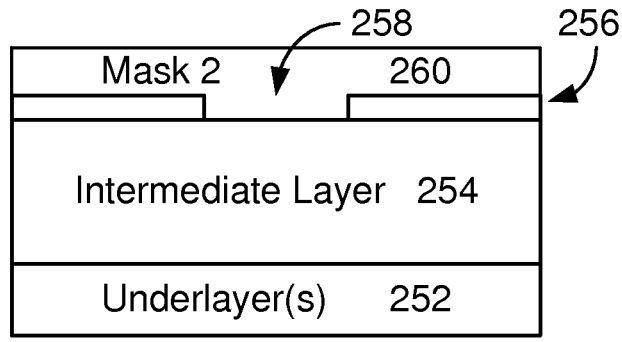
FIGS. 8A-8C through 10A, 10B, 10C and 10D depict various views of an exemplary embodiment of a magnetic recording transducer fabricated using the method.
Figure 8B:
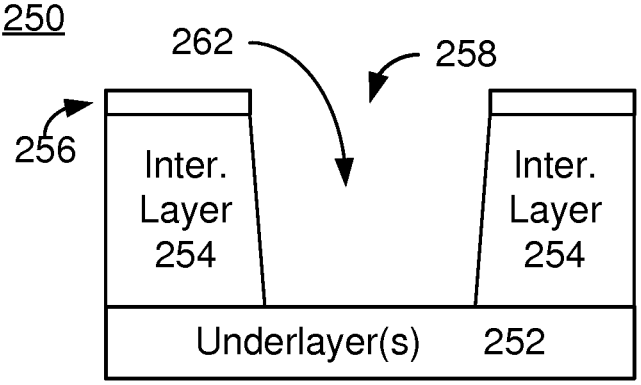
Figure 8C:
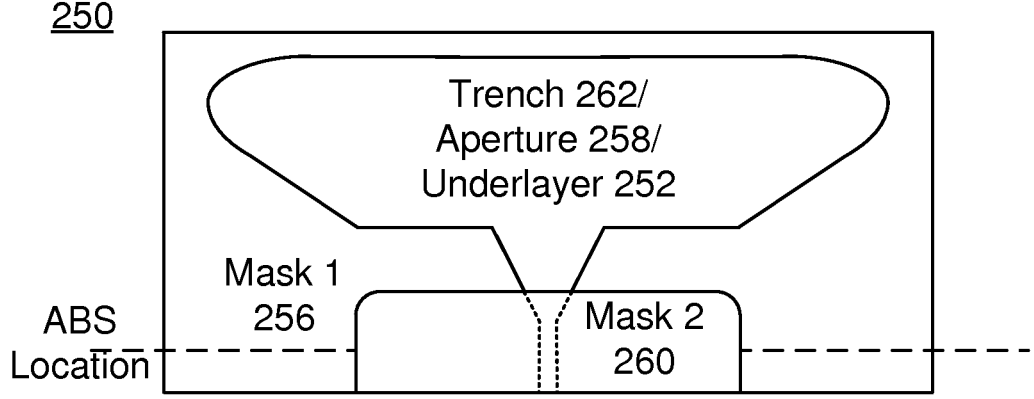

At least one mask that exposes a portion of the intermediate layer is provided, via step 158. A first etch is performed, via step 160. For example, a reactive ion etch (RIE) appropriate for the portion of the intermediate layer to be removed may be performed in step 160. FIGS. 8A, 8B and 8C depict ABS, recessed and plan views of one embodiment of a transducer 250 after step 160 has been performed. Thus, an underlayer 252 and intermediate layer 254 have been formed. In this embodiment, steps 154 and 156 have been omitted. The intermediate layer 254 may thus be a single layer of, for example, aluminum oxide or silicon oxide. The underlayer 252 may be a single layers or multiple layers. For example, in some embodiments, the portion of the underlayer 252 at and/or near the ABS is a leading shield. Also shown are masks 256 and 260. The mask 256 include an aperture 258 over both the pole tip region at/near the ABS and a recessed region. The second mask 260 covers the portion of the intermediate layer 254 around the ABS location. The ABS location is the surface that will form the ABS of the transducer 250. A trench 262 has been formed by step 160. Because of the presence of the mask 260, the trench 262 is only in the region recessed from the ABS. Thus, the trench 262 corresponds to the location and geometry desired form the pole in the yoke and paddle regions.

Figure 9A:
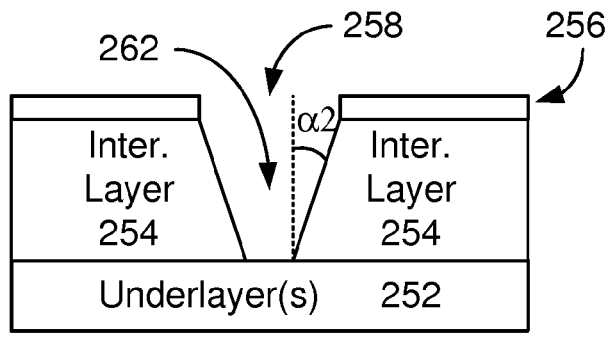
Figure 9B:
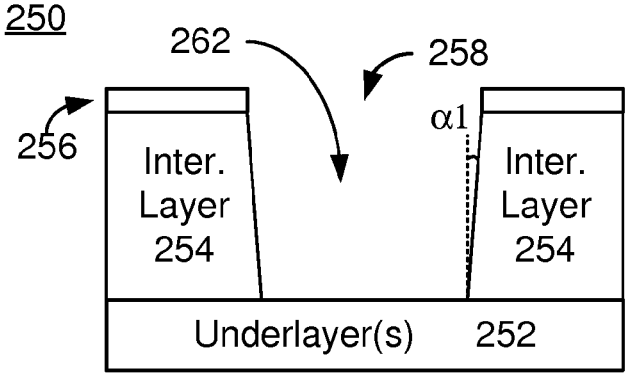
Figure 9C:
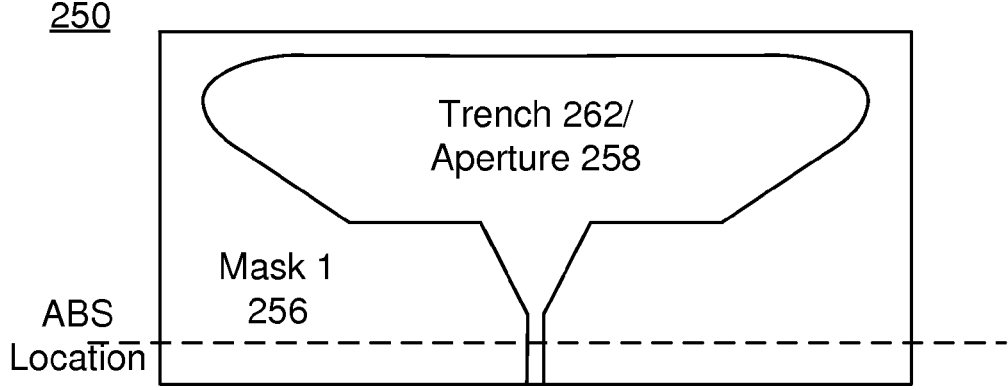

The mask 260 is removed, via step 162. Thus, an additional portion of the intermediate layer 254 is exposed in the aperture 258. An additional etch is performed, via step 164. If the intermediate layer 254 is a single layer, the same etch chemistry may be used for the RIE in step 164 as for step 160. In the embodiment shown in FIGS. 8A-10D, the etch chemistry may be suitable to remove aluminum oxide. The same etch chemistry may thus be used for steps 160 and 164 or different etch chemistries which both remove aluminum oxide may be used in steps 160 and 164. However in other embodiments, in which the intermediate layer includes different constituents, different etch chemistries may be used in steps 160 and 164. FIGS. 9A, 9B and 9C depict ABS, recessed and plan views of the transducer 250 after step 164 is performed. Thus, trench 262 has been formed in both the ABS/pole tip and recessed/yoke and paddle regions. The sidewall angle, α1, in the recessed view may be less than the sidewall angle, α2, at the ABS. in some embodiments, α1 is at least zero degrees and not more than five degrees. In some such embodiments, α1 is not more than three degrees. In contrast α2 is at least twelve degrees and not more than sixteen degrees.

A seed layer that is resistant to an etch of the intermediate layer 254 is deposited in the trench, via step 166. In some embodiments, this seed layer may serve as at least part of the gap. The seed layer may include material(s) such as Ru. In other embodiments, a magnetic seed layer may be used in lieu of or in addition to a nonmagnetic seed layer.

Figure 10A:
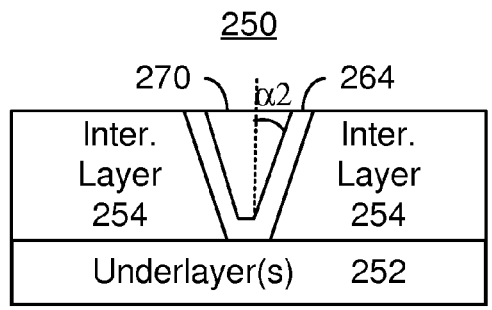
Figure 10B:
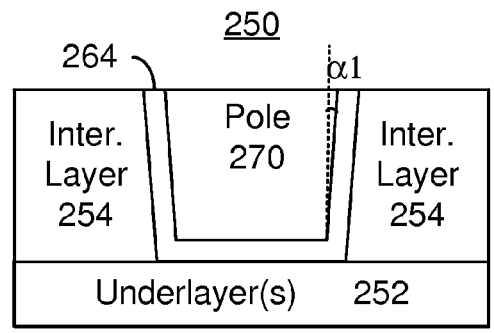
Figure 10C:
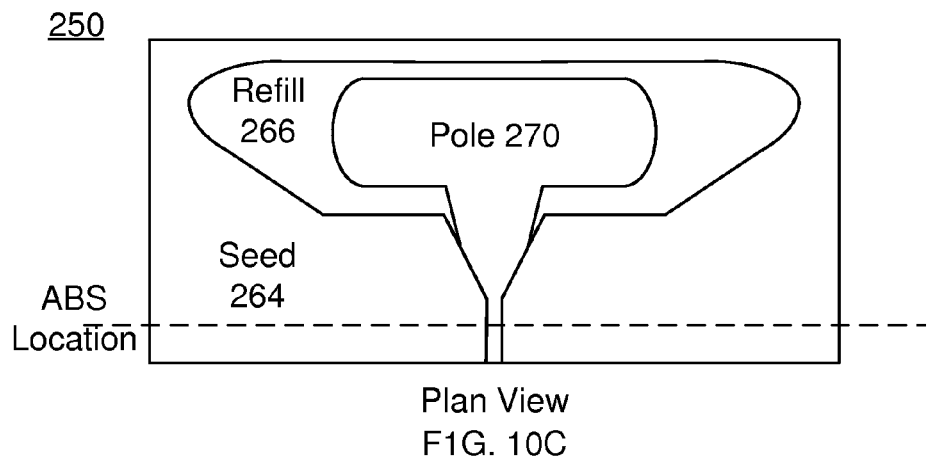
Figure 10D:
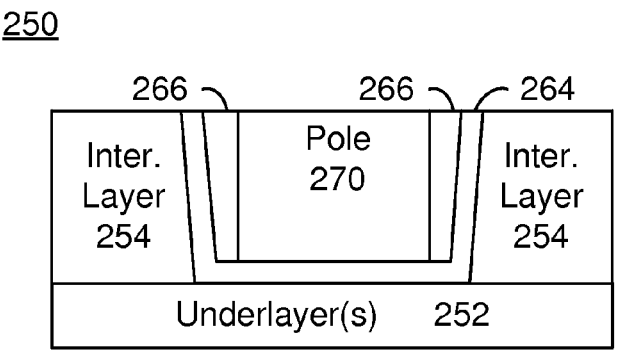

The main pole may then be provided, via step 168. Step 168 includes depositing high saturation magnetization magnetic material(s), for example via electroplating. In some embodiments, the pole provided in step 168 fills the trench 262. However, in other embodiments, the pole may occupy only a portion of the trench. For example, a mask such as a photoresist may be provided. The mask has an aperture that exposes only a portion of the trench 262. In some embodiments, all of the pole tip/ABS region is exposed, but only a portion of the yoke and paddle regions are exposed. The magnetic material(s) for the main pole may then be plated and the mask removed. A planarization, such as a chemical mechanical planarization (CMP) may also be performed. A leading bevel may be naturally formed in the magnetic pole in step 168 due to the shape of the trench 262 and the deposition techniques used. A trailing bevel may also be provided in step 168. For example, a portion of the main pole may be covered by a mask after the planarization. Another portion of the main pole at and near the ABS may be removed, for example via an ion mill. The portion of the trench 262 between the main pole and the seed layer(s) provided in step 166 may be optionally refilled with a nonmagnetic material, such as aluminum oxide, via step 170. In embodiments in which a side shield is provided, the refill and seed layers provided in step 166 may be used to form a side gap that is conformal in some regions and nonconformal in other regions. FIGS. 10A, 10B, 10C and 10D depict ABS, recessed, plan and yoke/paddle views, respectively, of the transducer. Thus, the main pole 270 is shown. In addition, a seed layer 265 and refill 266 have been provided. At and near the ABS, shown in FIGS. 10A, 10B and 10C, the pole 270 fills the trench. However, further from the ABS, the refill 266 occupies a region between the edges of the trench/seed layer 264 and the pole 270. Near the ABS, as shown in FIGS. 10A and 10B, the seed layer 264 may form the side gap. Thus, the side gap may be conformal in these region. Further from the ABS, for example as shown in FIG. 10D, the seed layer 264 and refill 266 form the side gap. In these regions, the side gap may be nonconformal with the pole/trench.

The portion of the intermediate layer outside of the trench 262 may optionally be removed, via step 172. The side shield(s) may be provided, via step 174. Step 174 may also include providing a wraparound shield. The magnetic material(s) may thus be plated or otherwise deposited.

Using the method 150, the pole 270 may be provided. The sidewall angles of the pole 270 may vary because of the manner in which the trench is formed and/or because the pole may be deposited with another mask in place. This may be achieved while exposing the ABS to only a single etch in forming the trench. In addition, a nonconformal side gap might be provided. This may also improve performance of the transducer 250. These benefits may be achieved without significantly complicating processing. Thus, performance of the disk drive may be improved.

Figure 11:
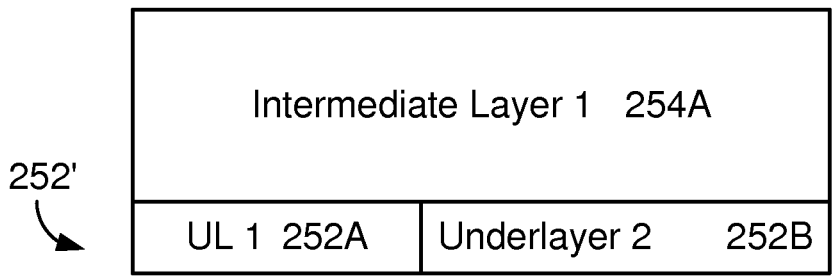

FIGS. 11-16D depict another embodiment of a transducer 250' fabricated using the method 150. In this embodiment, however, steps 154 and 156 are not skipped. FIG. 11 depicts a side view of the transducer 250' after step 152 is performed. Thus, as shown in FIG. 11, a first intermediate layer 254' is provided on an underlayer 252'. In the embodiment shown, the underlayer 252' includes a first underlayer 252A that may be NiFe and a second underlayer 252B that may be Ru.

Figure 12A:
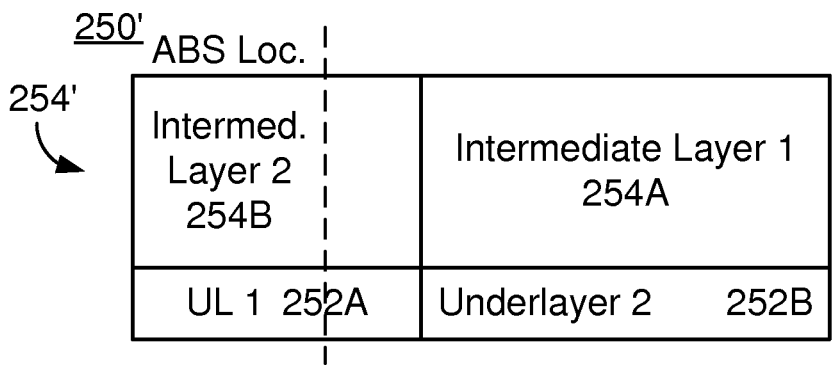
Figure 12B:
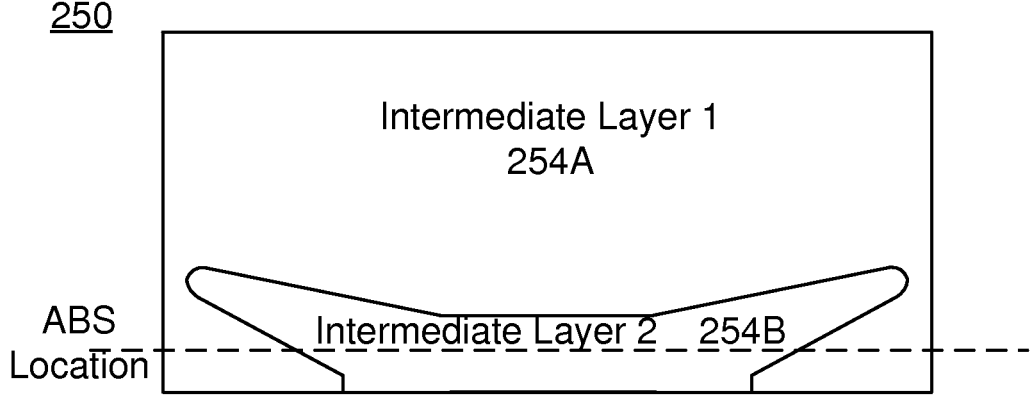

FIGS. 12A and 12B depict side and plan views of the transducer 250' after step 156 has been performed. Thus, a portion of the first intermediate layer 254A has been removed and replaced with a second intermediate layer 254B. The region in which the second intermediate layer 254B is formed includes the side shield area, as shown in FIG. 12B. In the embodiment shown, the region in which the second intermediate layer 254B is shown has a footprint that substantially matches that of the side shield to be formed. However, the second intermediate layer 254B may have a footprint with a different shape. In some embodiments the first intermediate layer 254A is silicon oxide, while the second intermediate layer is aluminum oxide or NiFe. Note that in alternate embodiments, the second intermediate layer could be full film deposited first, a portion removed and the region occupied by this portion refilled with the first intermediate layer.

FIGS. 13A, 13B, 13C and 13D depict ABS, recessed, plan and side views of the transducer 250' after step 160 has been performed. Thus, the mask 256' having aperture 258' has been formed. Mask 260' that covers the region near the ABS is also shown. A trench 262 has also been provided in the first intermediate layer 254A.

FIGS. 14A, 14B, 14C and 14D depict ABS, recessed, plan and side views of the transducer 250' after step 164 has been performed. Thus, the trench 262' has been formed in both intermediate layers 254A and 254B. Also note that in FIG. 14D that the second intermediate layer 254B has a surface that slopes in the direction perpendicular to the ABS such that the trench 262' has a varying height and width.

Figure 15A:
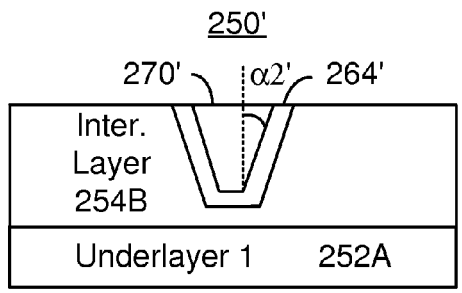
Figure 15B:
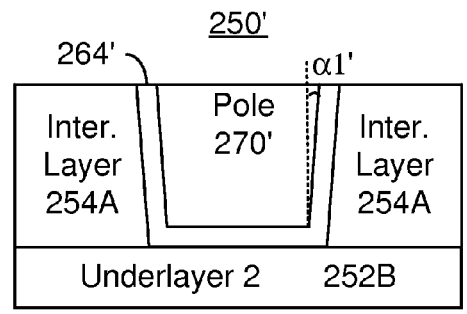
Figure 15C:
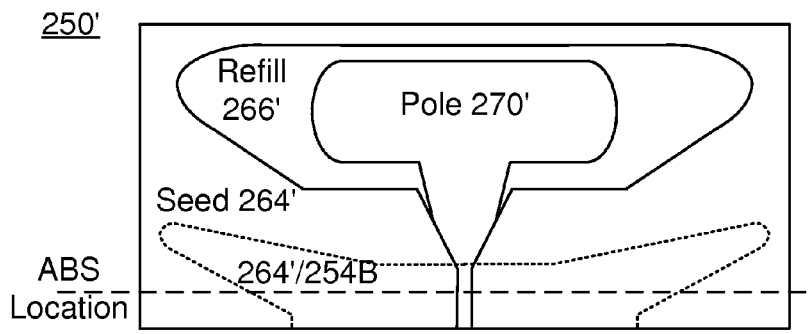
Figure 15D:
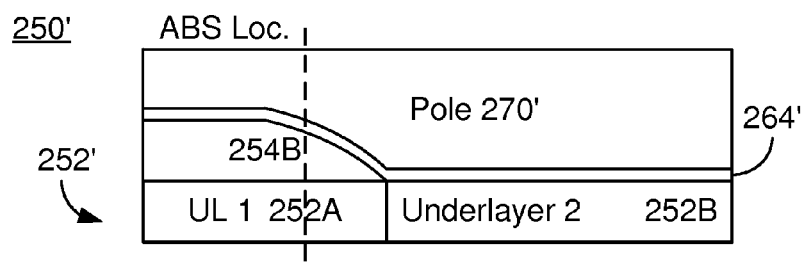
Figure 15E:
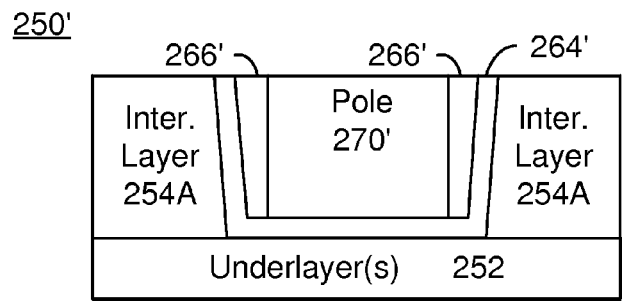

FIGS. 15A, 15B, 15C, 15D and 15E depict ABS, recessed, plan, side and yoke views of the transducer 250' after step 170 has been performed. Consequently, seed layer 264', pole 270' and refill 266' have been provided. As can be seen in FIGS. 15A, 15B and 15D, the pole 270' has a leading bevel.

Figure 16A:
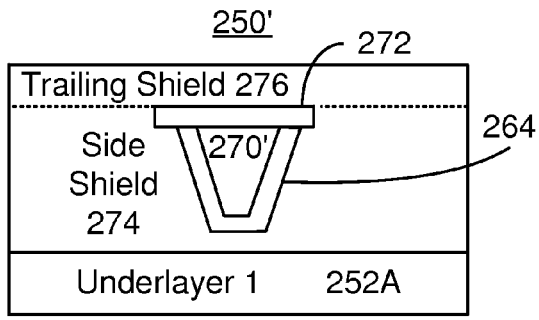
Figure 16B:
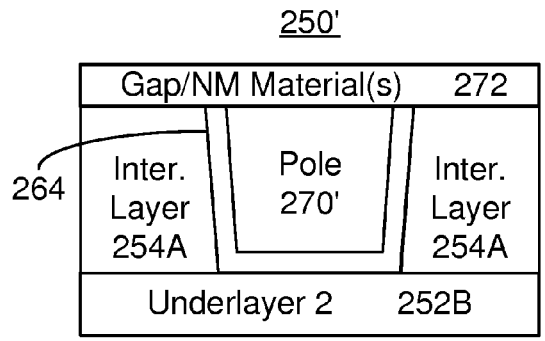
Figure 16C:
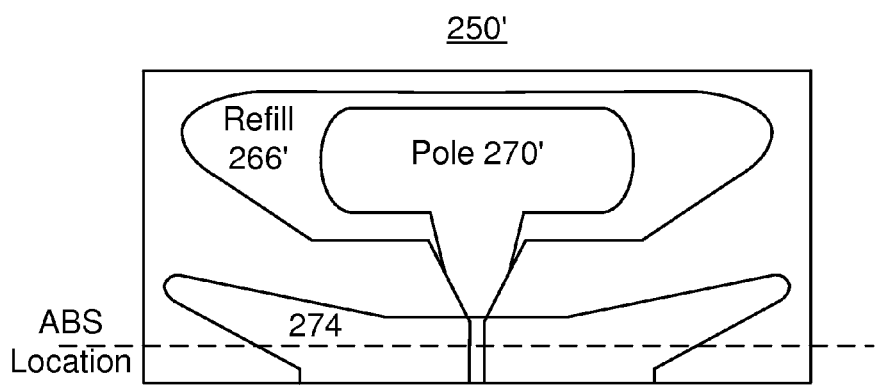
Figure 16D:
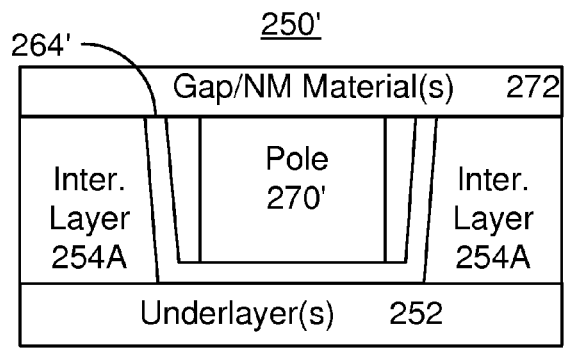

FIGS. 16A, 16B, 16C and 16D depict ABS, recessed, plan, side and yoke views of the transducer 250' after step 174 has been performed. Thus, side shields 274 and trailing shield 276 have been formed. Also shown is gap layer 272. The side shields 274 and trailing shield 276 together form a wraparound shield. As can be seen in FIG. 16C, the shields occupy substantially the same footprint as did the second intermediate layer 254B. The seed layer 264' forms the side gap in FIGS. 16A and 16B, but layers 264' and 266' form the gap for the further from the ABS location.

Using the method 150, the magnetic transducers 250 and/or 250' may be provided. The sidewall angles of the pole 270' may vary because of the manner in which the trench is formed and/or because the pole may be deposited with another mask in place. This may be achieved while exposing the ABS to only a single etch in forming the trench. In addition, a nonconformal side gap might be provided. This may also improve performance of the transducer 250'. These benefits may be achieved without significantly complicating processing. Thus, performance of the disk drive may be improved.

We claim:

1. A method for fabricating magnetic transducer having air-bearing surface (ABS) location and an intermediate layer comprising:

forming a trench in the intermediate layer using a plurality of etches, the trench having a plurality of trench sidewalls and a trench bottom, a first etch substantially providing a first portion of the trench having a first trench sidewall angle between the trench bottom and at least one of the plurality of trench sidewalls and the second etch substantially providing a second portion of the trench having a second trench sidewall angle between the trench bottom and the at least one of the plurality of trench sidewalls, the second trench sidewall angle being greater than the first trench sidewall angle, the second portion of the trench including the ABS location, the first portion of the trench being recessed from the ABS such that the second portion is between the first portion and the ABS location;

providing a main pole in the trench, the main pole having a plurality of sidewalls and a main pole bottom, the plurality of sidewalls having a first sidewall angle between the main pole bottom and at least one of the plurality of sidewalls in the first portion of the trench and a second sidewall angle between the main pole bottom and the at least one of the plurality of sidewalls in the second portion of the trench, the first sidewall angle being greater than the second sidewall angle.

2. The method of claim 1 wherein the first etch is performed before the second etch.

3. The method of claim 1 wherein the second etch is performed before the first etch.

4. The method of claim 1 wherein the step of providing the trench further includes:

providing a mask covering a portion of the intermediate layer including the ABS location;

removing a first portion of the intermediate layer corresponding to the first portion of the trench using a first etch of the plurality of etches;

removing the mask; and removing at least a second portion of the intermediate layer corresponding to the second portion of the trench using a second etch of the plurality of etches.

5. The method of claim 4 wherein the step of removing the first portion of the intermediate layer is performed before the step of removing the at least the second portion of the intermediate layer.

6. The method of claim 5 wherein the intermediate layer includes a first material and a second material, the method further comprising:

providing the first material in at least a first region corresponding to the first portion of the trench; and providing the second material in at least a second region corresponding to the second portion of the trench.

7. The method of claim 6 wherein the step of providing the first material further includes blanket depositing the first material and wherein the step of providing the second material further includes:

removing the first material in the at least the second region; and depositing the second material in at least the second region.

8. The method of claim 7 wherein the first material includes silicon oxide and the second material includes at least one of aluminum oxide and NiFe.

9. The method of claim 8 wherein the at least the second region includes a side shield region.

10. The method of claim 1 wherein the second sidewall angle is at least twelve degrees and not more than sixteen degrees and wherein the first sidewall angle is at least zero degrees and not more than five degrees.

11. The method of claim 10 wherein the first sidewall angle is not more than three degrees.

12. The method of claim 1 further comprising:

providing a side gap adjacent to a portion of the main pole; and providing a side shield, the side gap residing between the side shield and the main pole.

13. The method of claim 12 wherein the step of providing the side gap further includes:

providing a conformal portion of the side gap such that a first portion of the main pole is conformal with the trench; and providing a nonconformal portion of the side gap such that a second portion of the main pole is nonconformal with the trench.

14. A method for fabricating magnetic transducer having air-bearing surface (ABS) location comprising:

providing an intermediate layer;

providing a mask on the intermediate layer, the mask exposing a first portion of the intermediate layer and covering a first region of the intermediate layer, the first region including the ABS location;

performing a first etch to remove the first portion of the intermediate layer and form a first trench portion therein;

removing the mask;

performing a second etch after the step of removing the mask, the second etch removing at least a second portion of the intermediate layer and forming a trench therein, the second portion including the ABS location, the trench including the first trench portion and a second trench portion, the first trench portion having a first sidewall angle, the second trench portion having a second sidewall angle, the first sidewall angle being less than three degrees, the second sidewall angle being greater than the first sidewall angle and not more than fifteen degrees;

providing a main pole in the trench, the main pole having a plurality of sidewalls, the plurality of sidewalls having the first sidewall angle in the first portion of the trench and the second sidewall angle in the second portion of the trench;

providing a side gap adjacent to a portion of the main pole; and providing a side shield, the side gap residing between the side shield and the main pole.

15. The method of claim 14 wherein the intermediate layer includes a first material and a second material and wherein the step of providing the intermediate layer further includes:

blanket depositing the first material, the first material including silicon oxide;

removing the first material in a second region including the ABS location and a side shield region corresponding to the side shield; and depositing the second material in the second region, the second material including at least one of aluminum oxide and NiFe.

* * * * *